(12) United States Patent
Ogle et al.

(10) Patent No.: US 9,088,828 B2
(45) Date of Patent: Jul. 21, 2015

(54) SET-TOP BOX WITH INTERACTIVE PORTAL AND SYSTEM AND METHOD FOR USE OF SAME

(71) Applicant: Enseo, Inc., Richardson, TX (US)

(72) Inventors: Vanessa Ogle, Richardson, TX (US); Edward H. Wolfe, Plano, TX (US); Thomas R. Miller, Plano, TX (US)

(73) Assignee: Enseo, Inc., Richardson, TX (US)

( * ) Notice: Subject to any disclaimer, the term of this patent is extended or adjusted under 35 U.S.C. 154(b) by 0 days.

(21) Appl. No.: 14/294,123

(22) Filed: Jun. 2, 2014

(65) Prior Publication Data

US 2014/0359677 A1 Dec. 4, 2014

Related U.S. Application Data

(60) Provisional application No. 61/829,932, filed on May 31, 2013.

(51) Int. Cl.
*H04N 7/18* (2006.01)
*H04N 7/173* (2011.01)
*H04N 21/478* (2011.01)
*H04N 21/436* (2011.01)
*H04N 21/214* (2011.01)
*H04N 21/81* (2011.01)
*H04N 21/41* (2011.01)

(52) U.S. Cl.
CPC ......... *H04N 21/478* (2013.01); *H04N 21/2143* (2013.01); *H04N 21/4131* (2013.01); *H04N 21/436* (2013.01); *H04N 21/43615* (2013.01); *H04N 21/8126* (2013.01)

(58) Field of Classification Search
USPC ............................................ 725/78, 109, 119
See application file for complete search history.

(56) References Cited

U.S. PATENT DOCUMENTS 5,661,517 A * 8/1997 Budow et al. ................... 725/60

* cited by examiner

*Primary Examiner* — Nathan Flynn
*Assistant Examiner* — Sumaiya A Chowdhury
(74) *Attorney, Agent, or Firm* — Scott T. Griggs; Griggs Bergen LLP

(57) ABSTRACT

A set-top box with an interactive portal and system and method for use of the same are disclosed. In one embodiment of the set-top box, the set-top box is deployed to provide an interactive portal in a hospitality establishment having multiple rooms, such as a hotel. The set-top box is associated with a room and includes a housing that secures a television input, a television output, a processor, a transceiver, and memory therein in an interconnected bus architecture. The set-top box generates a guest interactive portal as well as a housekeeping interactive portal for a guest and housekeeper, respectively. Each of the portals provides relevant feedback on the condition of the room to a server associated with the hotel.

20 Claims, 5 Drawing Sheets

SET-TOP BOX WITH INTERACTIVE PORTAL AND SYSTEM AND METHOD FOR USE OF SAME

PRIORITY STATEMENT

This application claims priority from co-pending U.S. Patent Application Ser. No. 61/829,932 entitled "On-Screen Display" and filed on May 31, 2013 in the name of Vanessa Ogle; which is hereby incorporated by reference for all purposes.

TECHNICAL FIELD OF THE INVENTION

This invention relates, in general, to set-top boxes and, in particular, to set-top boxes with interactive portals and systems and methods for use of the same that provide additional functionality to the hospitality lodging industry, as an example.

BACKGROUND OF THE INVENTION

Without limiting the scope of the present invention, the background will be described in relation to the hospitality lodging industry, as an example. Housekeepers have one of the most important roles in the hospitality lodging industry. The hotel or other lodging establishment needs to be presentable, clean, and sanitary. To these ends, the duties of a housekeeper include making sure each hotel room has enough hygiene products, stationery, clean linens, clean drink ware and a supply of beverages, for example. Typically, hotels may provide housekeepers with clipboards and checklists as an informational job aid to ensure completion of each housekeeper's tasks and reduce failure by compensating for potential limits of human memory and attention. Such a paper-dependent approach has proven to be a limitation in an ever increasing paperless hospitality lodging industry. Accordingly, there is a need for improved systems and methods that ensure the completion of housekeeping tasks, while integrating well into existing and planned hospitality lodging establishments.

SUMMARY OF THE INVENTION

It would be advantageous to introduce systems and methods that further the completion of housekeeping tasks—and other operational and maintenance tasks—in hospitality lodging establishments to ensure completion of the tasks and reduce failure. It would also be desirable to enable a computer-based solution that would mitigate the dependency on paper and integrate well into existing and planned hospitality lodging establishments. To better address one or more of these concerns, a set-top box with an interactive portal and systems and methods for use of the same are disclosed. In one embodiment of the set-top box, the set-top box is deployed to provide an interactive portal in a hospitality establishment having multiple rooms, such as a hotel. The set-top box is associated with a room and includes a housing that secures a television input, a television output, a processor, a transceiver, and memory therein in an interconnected bus architecture. The set-top box generates a guest interactive portal as well as a housekeeping interactive portal for a guest and housekeeper, respectively. Each of the portals provides relevant feedback on the condition of the room to a server associated with the hotel.

In another embodiment, a system deploys the set-top boxes in rooms throughout the lodging establishment. The interactive instructions prompted by guests using the guest interactive portal are utilized to dynamically maintain a housekeeping schedule and a maintenance schedule. Further, the interactive instructions prompted by housekeepers using the housekeeping interactive portal are utilized to dynamically maintain the maintenance schedule. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
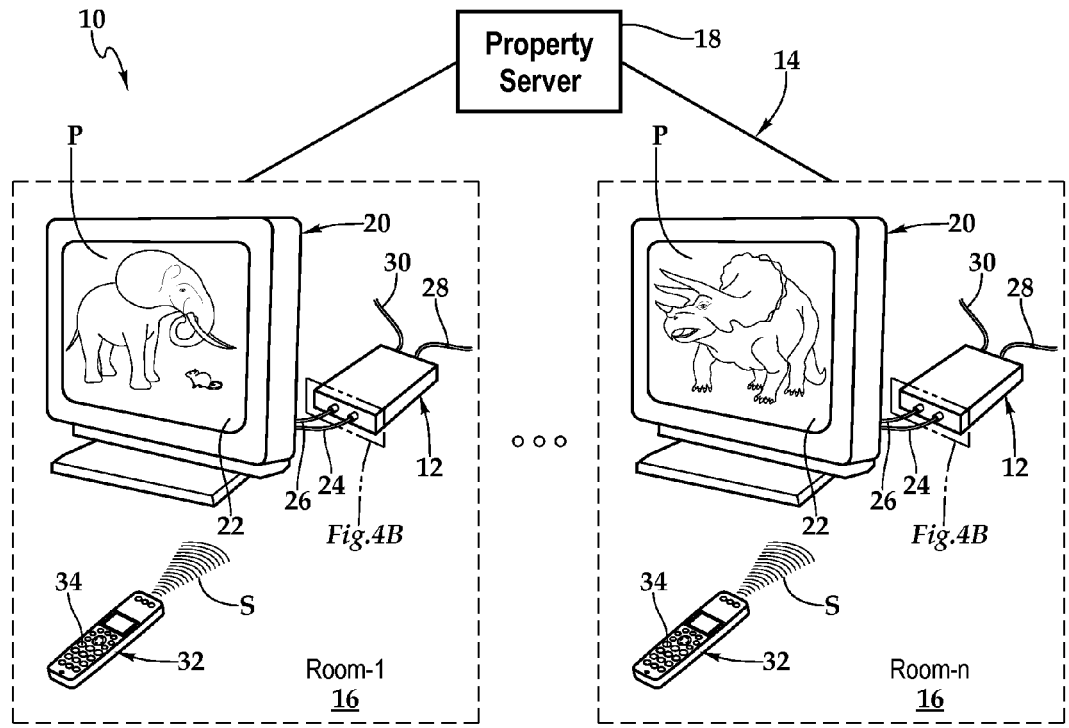
FIG. 1 is schematic diagram depicting one embodiment of a system utilizing set-top boxes with interactive portals being employed in a hospitality lodging establishment, according to the teachings presented herein.

Referring initially to FIG. 1, therein is depicted one embodiment of a system 10 utilizing set-top boxes 12 with interactive portals being employed within a hospitality lodging establishment 14. The hospitality lodging establishment or more generally, hospitality property, may be a furnished multi-family residence, dormitory, lodging establishment, hotel, hospital, or other multi-unit environment. As shown, by way of example and not by way of limitation, the hospitality environment is depicted as the hotel 14 having various rooms 16. The set-top boxes 12 are communicatively disposed with various amenities associated with the hospitality environment, which as mentioned is depicted as the hotel 14. The set-top boxes 12 may be deployed throughout the rooms 16 of the hotel 14 and are in communication with a property server 18, which is co-located at the hotel 14.

As shown, in one embodiment, within a room 16, the system 10 includes the set-top box 12 and a display illustrated as television 20 having a screen 22. A connection, which is depicted as an HDMI connection 24, connects the set-top box 12 to the television 20. Other connections include a power cable 26 coupling the set-top box 12 to a power source, a coaxial cable 28 coupling the set-top box 12 to an external cable source, and a category five (Cat 5) cable 30 coupling the set-top box 12 to external pay-per-view source at the hotel 14. It should be appreciated that the cabling connected to the set-top box 12 will depend on the environment and application and the cabling connections presented in FIG. 1 are depicted for illustrative purposes. Further, it should appreciated that the positioning of the set-top box 12 will vary depending on environment and application and, with certain functionality, the set-top box 12 may be placed more discretely, or even entirely, behind the television 20.

A television remote control 32 includes an array of buttons 34 for adjusting various settings such as television channel and volume. In one embodiment, the television remote control 30 may be a consumer infrared (IR), Bluetooth or other wireless-protocol-based device configured as a small wireless handheld object that issues commands, such as signals S, from a distance to the set-top box 12 in order to control the television 20 via the set-top box 12, for example. By way of example, program P is being shown on the screen 22 of the television 20.

Figure 2:
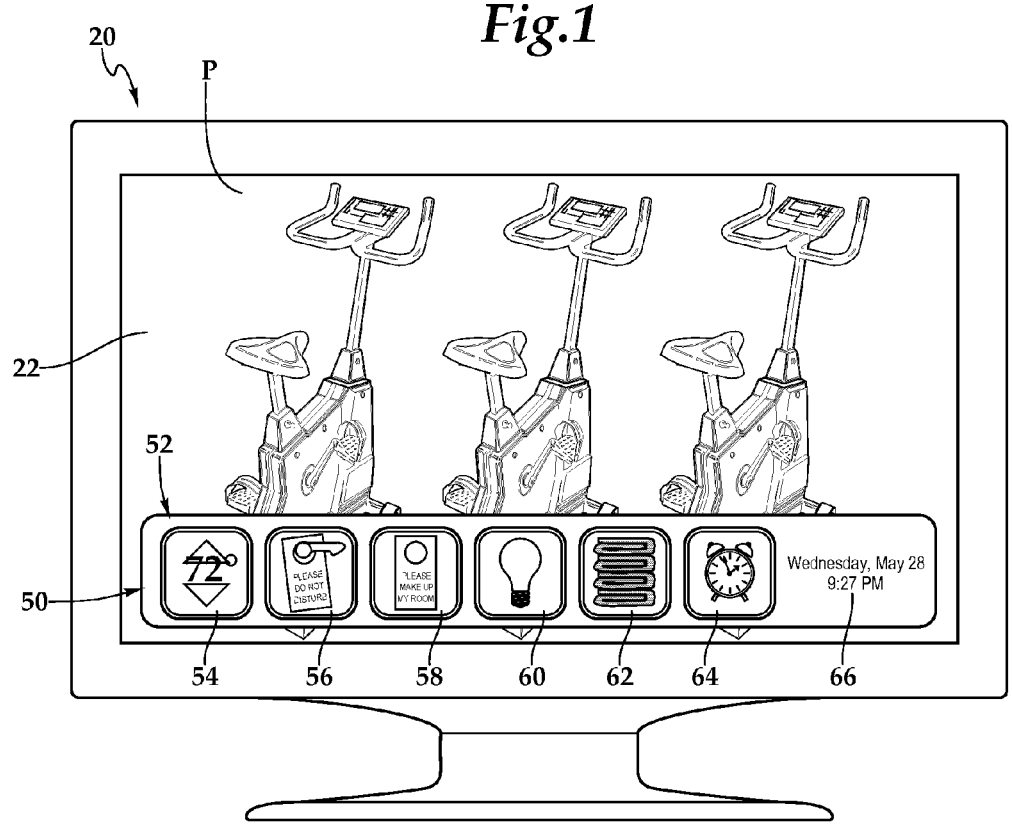
FIG. 2 is a front elevation view of one embodiment of a room within the hospitality lodging establishment, illustrating components in a guest configuration, which form a portion of the system depicted in FIG. 1.

Referring now to FIG. 2, in response to receiving a guest service request from a user of the remote control 32, for example, the set-top box 12 has generated a guest interactive portal 50. In one implementation, the user may press service button of the buttons 34 or navigate a menu to cause the generation of the guest interactive portal 50, which may be overlayed or superimposed on the program P in one embodiment. The guest interactive portal includes interactive icons 52, and more particularly icons 54, 56, 58, 60, 62, and 64. Additionally, informational presentation 66 is provided, which includes date and time. It should be appreciated that any number or configuration of interactive icons 52 may be presented, including an entire screen of interactive icons 52 or a scrolling feature allowing a defined space to provide many sheets of interactive icons 52. By way of example and not by way of limitation, the interactive icons 52 may include do not disturb, make up room, additional towels, fresh linens, or turn-back service, for example.

In the embodiment shown, icon 52 provides guest interaction with the HVAC system to control the environment. Icons 56 and 58 provide the guest with a mechanism to inform housekeeping that the guest does not wish to be disturbed or that the room is ready to be made up. Typically, such indications are placed on the guest's door. The embodiments presented herein provide by way of the set-top box a portal for the guest to furnish this indication virtually and directly to the property server 18. Continuing with the description of FIG. 2, icon 60 indicates that a light bulb needs replacement and actuation of this icon by way of the remote control 32, for example, generates, by way of the set-top box 12, a maintenance request in substantially real time. Icon 62 indicates additional towels are required and icon 64 indicates that a wake-up call is requested.

Figure 3A:
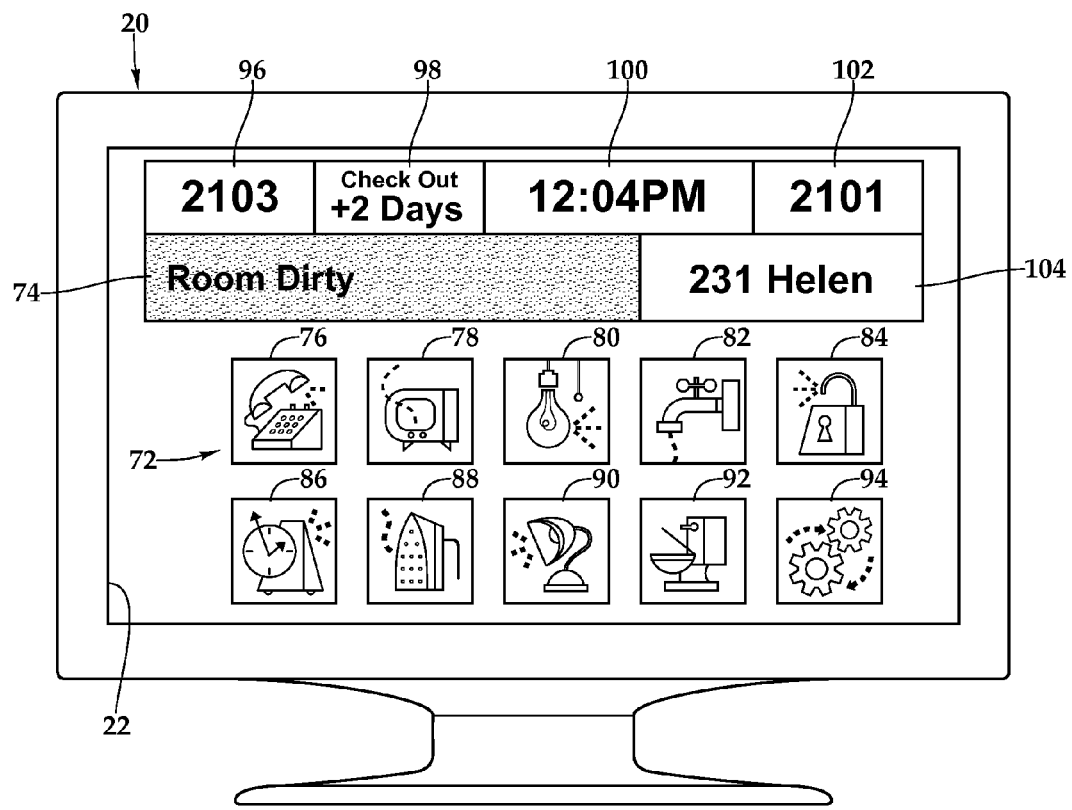
FIG. 3A is a front elevation view of one embodiment of the room within the hospitality lodging establishment, illustrating components in a first housekeeping configuration.
Figure 3B:
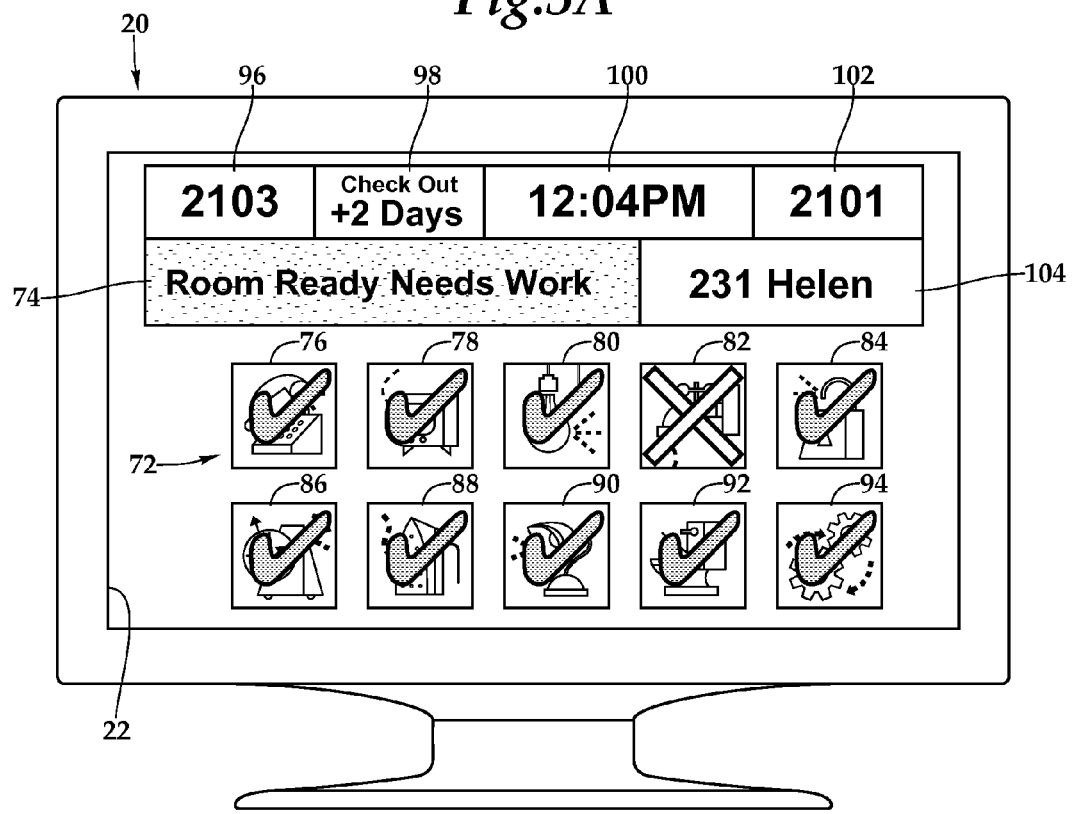
FIG. 3B is a front elevation view of one embodiment of the room within the hospitality lodging establishment, illustrating components in a second housekeeping configuration.

Referring to FIG. 3A and FIG. 3B, in response to receiving a housekeeping service request from a housekeeper or may access the set-top box 12 by way of the remote control 32, for example, the set-top box 12 has generated a housekeeping interactive portal 70. In one implementation, the user or housekeeper may press a service button, with a passkey, for example, of the buttons 34 or navigate a menu to cause the generation of the housekeeping interactive portal 70, which may be a separate channel in one embodiment. The housekeeping interactive portal includes interactive icons 72, and more particularly icons 74, 76, 78, 80, 82, 84, 86, 88, 90, 92, and 94. Additionally, informational presentations 96, 98, 100, 102, and 104 are provided. As discussed with respect to the guest interactive portal 50, the housekeeping interactive portal may include any number and arrangement of icons and informational presentations. Moreover, in one implementation, the icons and information presentations may be language independent. In this manner, the set-top box 12 is providing various housekeeping and maintenance support without the need for additional technology. An existing appliance in a hotel room or other lodging establishment may be leveraged. Further, complex systems that require additional training are not needed as the systems and methods presented herein are intuitive. Further still, rooms are made ready faster while reducing labor costs through substantially real time housekeeping and maintenance data collection and optimization of the deployment of staff, including maintenance support.

In the embodiment presented in FIGS. 3A and 3B, the icons may represent telephone maintenance 76, television maintenance 78, light bulb maintenance 80, faucet maintenance 82, lock maintenance 84, clock maintenance 86, iron maintenance 88, light fixture maintenance 90, toilet maintenance 92, HVAC maintenance (not shown), refrigerator maintenance (not shown), Wi/Fi maintenance (not shown), or general maintenance (94), by way of example, and not by way of limitation. Icon 74 provides a toggle about the status of room (dirty/clean/ready (needs work). Informational presentation 96 indicates the current room, information presentation 98 indicates the number of days until checkout, which provides an indication if a deep clean is needed. Information presentation 100 indicates the time. As mentioned, the next room to be cleaned by the housekeeper is indicated at informational or information presentation 102. This information is provided by the property server on an updated basis depending on the housekeeping schedule and other information gathered. At information presentation 104, the name and identification of the housekeeper cleaning the room is provided.

In operation, the housekeeping interactive portal is accessed by the housekeeper via a special remote control or a menu requiring a passcode. By comparing FIGS. 3A and 3B, Helen, the housekeeper has, using the remote control, for example, completed the maintenance checklist, which serves as an informational job aid to ensure completion of each housekeeper's tasks and reduce failure by compensating for potential limits of human memory and attention. As shown, the room has been cleaned and "Room Dirty" toggled to "Room Ready Needs Work" as on the maintenance portion of the checklist, the faucet is leaking and requires maintenance. As displayed, in one embodiment, "checks" indicate the maintenance item has been checked and works property and the "X" indicates maintenance is needed. This information is routed to the property server which then prioritizes the maintenance request and updates the maintenance schedule. Importantly, as the set-top box is associated with a particular room and provides, in one implementation, a room identification with transmissions to the property server, the type of issue and the room is immediately known by the property server. Following completion of the room, Helen advances from room 402 to 403.

Figure 4A:
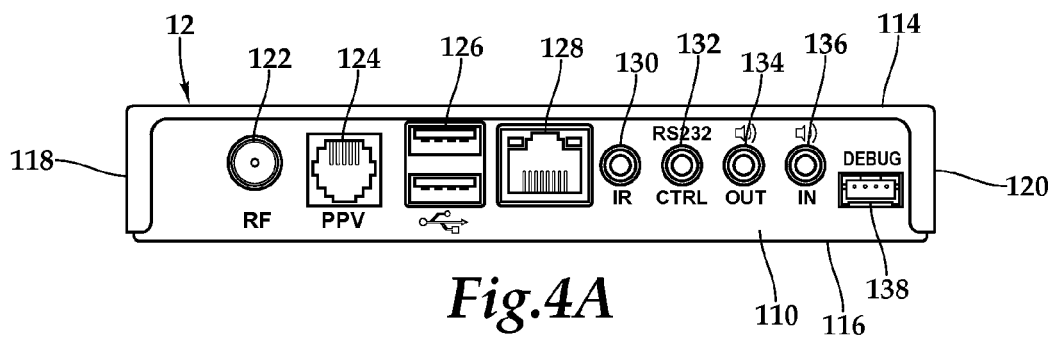
FIG. 4A is a front elevation view of one embodiment of a set-top box depicted in FIG. 1 in further detail.
Figure 4B:
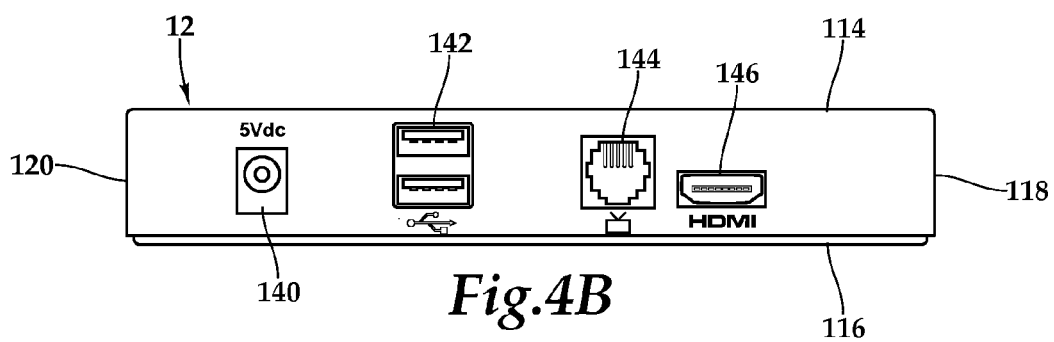
FIG. 4B is a rear elevation view of the set-top box depicted in FIG. 4A.
Figure 5:
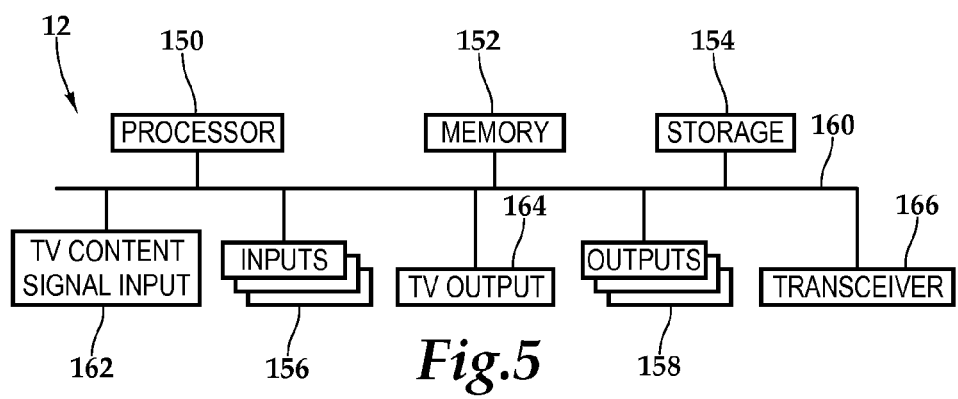
FIG. 5 is a functional block diagram depicting one embodiment of the set-top box presented in FIGS. 4A and 4B.

Referring now to FIG. 4A, FIG. 4B, and FIG. 5, as used herein, set-top boxes, back boxes and set-top/back boxes may be discussed set-top back boxes. By way of example, the set-top box 12 may be a set-top unit that is an information appliance device that generally contains set-top box functionality including having a television-tuner input and displays output through a connection to a display or television set and an external source of signal, turning by way of tuning the source signal into content in a form that can then be displayed on the television screen or other display device. Such set-top boxes are used in cable television, satellite television, and over-the-air television systems, for example.

The set-top box 12 includes a housing 108 having a front wall 110, rear wall 112, top wall 114, bottom base 116, and two sidewalls 118, 120. It should be appreciated that front wall, rear wall, and side wall are relative terms used for descriptive purposes and the orientation of the walls may vary depending on application. The front wall includes various ports, ports 122, 124, 126, 128, 130, 132, 134, 136, and 128 that provide interfaces for various interfaces, including inputs and outputs. In one implementation, as illustrated, the ports 122 through 128 include inputs 156 and outputs 158 and, more particularly, an Rf input 122, a RJ45 input 124, universal serial bus (USB) input/outputs 126, an Ethernet category 5 (Cat 5) coupling 128, an internal reset 130, an RS232 control 132, an audio out 134, an audio in 136, and a debug/maintenance port 138. The rear wall 112 also includes various inputs 156 and outputs 158. More particularly, ports 140, 142, 144, and 146 include a 5V dc power connection 140, USB inputs/outputs 142, an RJ-45 coupling 144, and an HDMI port 146. It should be appreciated that the configuration of ports may vary with the set-top box depending on application and context.

Within the housing 108, a processor 150, memory 152, storage 154, the inputs 156, and the outputs 158 are interconnected by a bus architecture 160 in a mounting architecture. The processor 150 may process instructions for execution within the computing device, including instructions stored in the memory 152 or in storage 154. The memory 152 stores information within the computing device, as shown, the set-top box 12. In one implementation, the memory 152 is a volatile memory unit or units. In another implementation, the memory 152 is a non-volatile memory unit or units. Storage 154 provides capacity that is capable of providing mass storage for the set-top box 12. As discussed, various inputs 156 and outputs 158 provide connections to and from the computing device, wherein the inputs 156 are the signals or data received by the set-top box 12, and the outputs 156 are the signals or data sent from the set-top box 12.

A television content signal input 162 and a television output 164 are also secured in the housing 108 in order to receive content from a source, that is, a source external to the set-top box 12, in the hospitality property, for example, and forward the content to the television located within the hotel room, for example. A transceiver 166 is associated with the set-top box 12 and communicatively disposed with the bus 160. As shown the transceiver 166 may be internal, external, or a combination thereof to the housing 108. Communication between various amenities in the hotel room, including even the remote control 32, and the set-top box 12 may be enabled by a variety of wireless methodologies employed by the transceiver 56, including 802.11, 3G, 4G, Edge, WiFi, ZigBee, near field communications (NFC), Bluetooth low energy and Bluetooth, for example. Also, infrared (IR) may be utilized.

The memory 152 and storage 154 are accessible to the processor 150 and include processor-executable instructions that, when executed, cause the processor 150 to execute a series of operations. The processor-executable instructions receive a next room assignment from a server for populating informational presentation 102, for example in the housekeeping interactive portal 70. In response to receiving a guest service request via the remote control, for example, the processor-executable instructions cause the generation of the guest interactive portal including a first interactive icon relative to the housekeeping of the assigned room and a second interactive icon relative to maintenance of the assigned room.

Further, the processor-executable instructions cause, in response to a housekeeping servicing request received at the transceiver from the remote control, for example, the generation of a housekeeping interactive portal including a third interactive icon relative to the clean/dirty status of the assigned room, a fourth interactive icon relative to maintenance of the assigned room, and the next room assignment. In one implementation, the room status (clean/dirty/etc.) may be re-set by the set-top box periodically, such as each night, to ensure cleaning if a room is occupied. The property server may inform a set-top box of room occupation, in one implementation, or the set-top box may detect activity above a certain threshold indicating occupancy. As alluded, the fourth icon functions as a checklist configured to ensure completion of a housekeeping maintenance review list. The processor-executable instructions then forward either the guest interactive portal or the housekeeping interactive portal to the television via the television output.

Instructions may be received, including an interactive instruction relative to one of the first, second, third, and fourth interactive requests via the transceiver from the individual interactively utilizing the respective interactive portal with the remote control, for example. The received instructions are then forwarded to the property server so that various housekeeping schedules and maintenance schedules may be updated in substantially real time. Further, work flow plans may be arranged and the housekeeping and maintenance schedules optimized to make better use of personal time. Thus, improving property management.

Figure 6A:
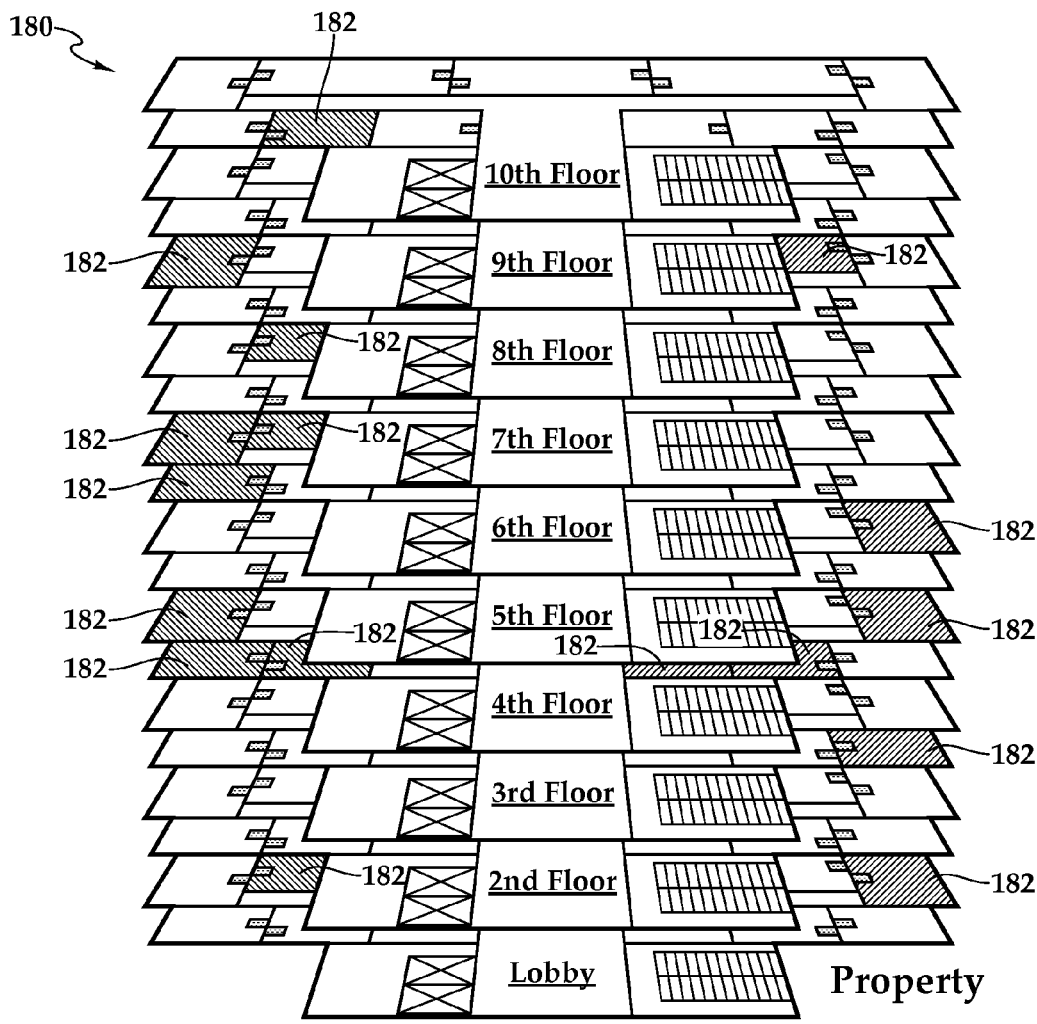
FIG. 6A is a schematic diagram depicting one embodiment of a digital representation of the hospitality lodging establishment presented in FIG. 1.
Figure 6B:
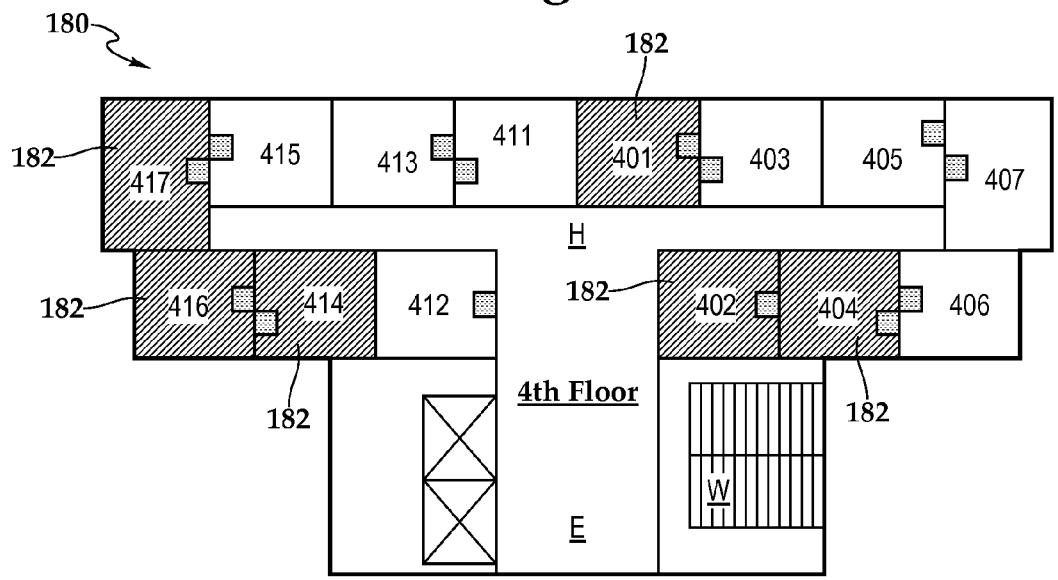
FIG. 6B is a schematic diagram depicting one embodiment of a digital representation of a floor of the hospitality lodging establishment presented in FIG. 6A.

Referring now to FIG. 6A and FIG. 6B, in one implementation, property monitoring and optimization is provided in the form of a database, or as shown, in a graphical presentation 180 wherein particular hotel rooms with housekeeping and maintenance status in substantially real time permits a user or manager to select the desired information and make optimal housekeeping and maintenance plans. In particular, color-coding and hue assignment adds additional understanding and visibility into housekeeping and maintenance conditions as well as use. By way of example and not by way of limitation, the hotel is graphical depicted 180 as having a lobby and ten floors, which are lobby, $1^{st}$ floor, $2^{nd}$ floor, etc. For each floor, such as the $4^{th}$ floor, a floor layout is shown with rooms, such as rooms 401 through 407 and 411 through 417. In FIGS. 6A and 6B, by collecting the substantially real time housekeeping and maintenance information from the field, i.e., from guests as well as housekeeping, a map may shown depicting all rooms with an outstanding maintenance need 182, for example. In particular, room 402 from FIGS. 3A and 3B is highlighted due to the faucet maintenance issue reported by the housekeeping staff during the routine, daily cleaning. With this information and knowledge of the issue maintenance may appropriately prioritize the requests, handle the requests in an optimal order, and bring all needed equipment. As mentioned, it should be appreciated that other types of databases and charts may be prepared from the substantially real time information collected.

Figure 7:
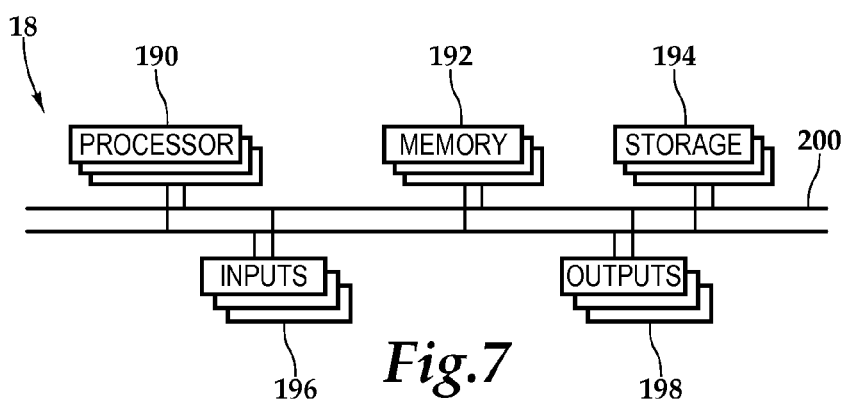
FIG. 7 is a functional block diagram depicting one embodiment of the server presented in FIG. 1.

Referring now to FIG. 7, the server 18 is depicted as a computing device that includes a processor 190, memory 192, storage 194, inputs 196, and outputs 198 interconnected with various buses 200 in a common or distributed, for example, mounting architecture. In other implementations, in the computing device, multiple processors and/or multiple buses may be used, as appropriate, along with multiple memories and types of memory. Further still, in other implementations, multiple computing devices may be provided and operations distributed therebetween. The processor 190 may process instructions for execution within the computing device, including instructions stored in the memory 192 or in storage 194. The memory 192 stores information within the computing device. In one implementation, the memory 192 is a volatile memory unit or units. In another implementation, the memory 92 is a non-volatile memory unit or units. The storage 194 may provide a capacity that is capable of providing mass storage for the computing device. Various inputs 196 and outputs 198 provide connections to and from the computing device.

The memory 192 and storage 194 are accessible to the processor and include processor-executable instructions that, when executed, cause the processor to execute a series of operations. The processor-executable instructions cause the server to access the memory and storage to maintain and periodically optimize, as interactive requests and data are received, a housekeeping schedule and a maintenance schedule, respectively indicating a list of the rooms needing cleaning the order to be cleaned, and the rooms requiring maintenance, the type of maintenance, and the order in which the maintenance issues will be addressed. In particular, it should be appreciated that prioritization of requests can occur within the systems and methods presented herein. The processor-executable instructions further cause the server to send next room assignments to the set-top boxes and receive information about the status of rooms (dirty/clean/clean (needs work) as the information becomes available.

Figure 8:
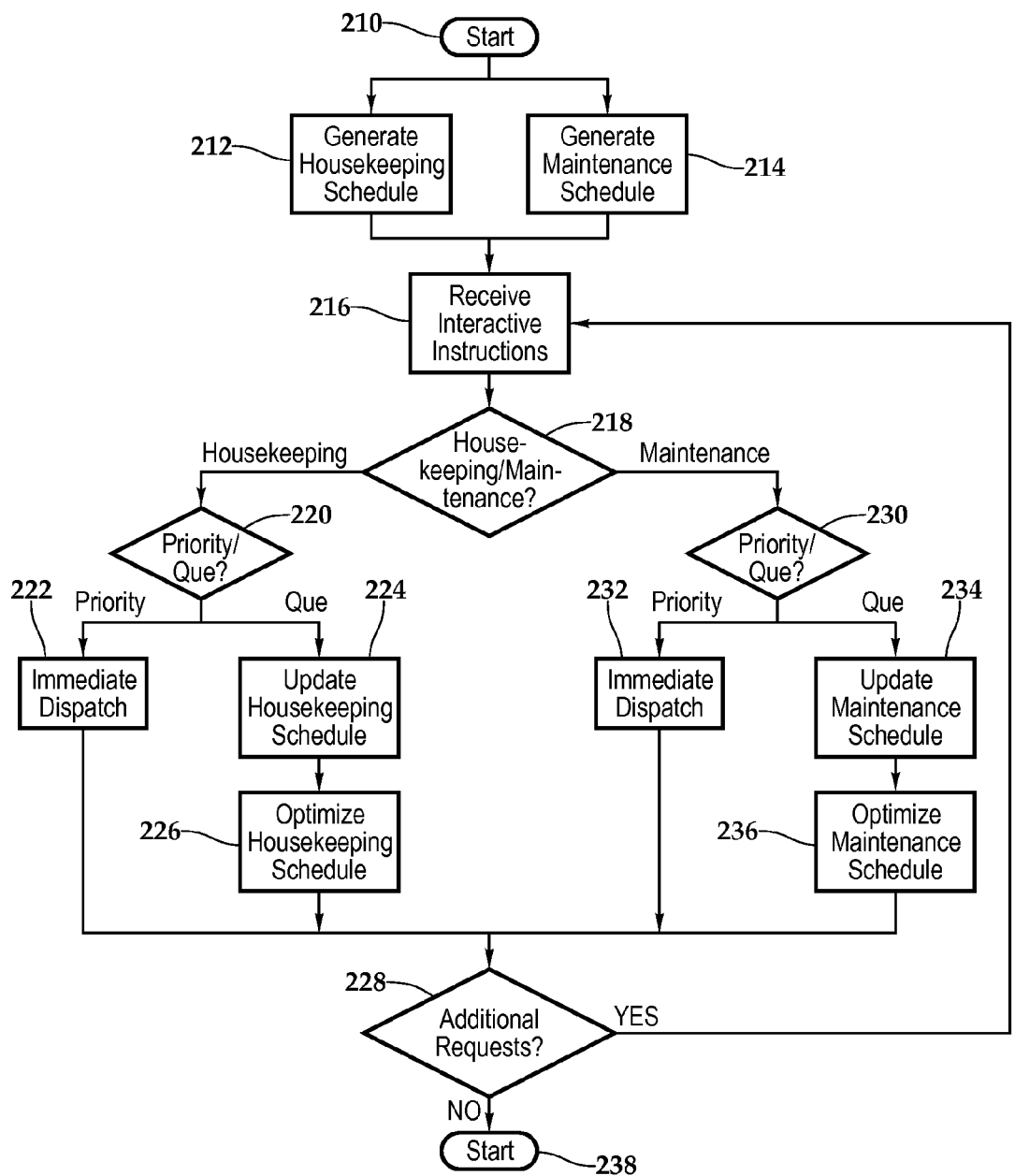
FIG. 8 is a flow chart depicting one embodiment of a method utilizing set-top boxes with interactive portals according to the teachings presented herein.

Referring now to FIG. 8, one embodiment of a method utilizing set-top boxes with interactive portals within the hospitality lodging industry is depicted. At block 210, the methodology is initiated. At blocks 212 and 214 respectively, housekeeping and maintenance schedules are generated. At block 216, interactive instructions are received from a set-top box. The hardware and software on the set-top box, in one embodiment, define interactive applications that provide the equivalent to a room attendant. At decision block 218, the interactive instructions are examined at the property server to determine if the instructions relate to housekeeping or maintenance. It should be appreciated that the application may be available at a location remote to the property via a property management interface. If the instructions relate to housekeeping, then continuing to decision block 220, the housekeeping instructions are examined to determine if it is a priority item or if it may be queued. At block 222, if it is a priority item, then housekeeping is immediately dispatched. On the other hand, at blocks 224 and 226, if the item is queued, then the housekeeping schedule is updated and optimized, if needed. The methodology from blocks 222 and 226 then joins at decision block 228, where if there are additional requests, then the method returns to block 216.

Returning to decision block 218, if the interactive instructions are maintenance related then priority is determined at decision block 230 before advancing to immediate dispatch at block 232 or updated maintenance schedule and optimization thereof at blocks 234 and 236. The flow chart then advances to decision block 228, where if no additional requests are present, then the methodology ends at 238.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system for operating a hospitality establishment having a plurality of rooms, the system comprising:
a plurality of set-top boxes respectively disposed in the plurality of rooms, each set-top box programmably assigned to a respective room, each set-top box comprising:
a housing securing a television input, a television output, a processor, a transceiver, and memory therein;
a busing architecture communicatively interconnecting the television input, the television output, the transceiver, the processor, and the memory therebetween;
the television input configured to receive a source signal from an external source, the source signal including a plurality of channels;
the television output configured to forward a tuned signal to a television in the assigned room, the signal being tuned from the source signal at the set-top box; and
the memory accessible to the processor, the memory including processor-executable instructions that, when executed, cause the processor to:
receive a next room assignment from a server;
in response to receiving a guest service request, generate a guest interactive portal including a first interactive icon relative to housekeeping of the assigned room and a second interactive icon relative to maintenance of the assigned room;
in response to a housekeeping servicing request, generate a housekeeping interactive portal including a third interactive icon relative to the clean/dirty status of the assigned room, a fourth interactive icon relative to maintenance of the assigned room, and the next room assignment, the fourth icon functioning as a checklist configured to ensure completion of a housekeeping maintenance review list;
forward one of the guest interactive portal and the housekeeping interactive portal to the television via the television output; and
receive an interactive instruction relative to one of the first, second, third, and fourth interactive requests;
the server being disposed in communication with the plurality of set-top boxes, the server being co-located at the hospitality establishment;
the server sending each of the plurality of set-top boxes the next room assignment; and
the server receiving the interactive instructions relative to the first, second, third, and fourth interactive requests.

2. The system as recited in claim 1, further comprising a housekeeping schedule stored at the server, the next room assignment forming a portion of the housekeeping schedule, which is dynamically maintained based on the interactive instructions received at the server relative to the first interactive icon.

3. The system as recited in claim 1, further comprising a maintenance schedule stored at the server, the maintenance schedule being dynamically maintained based on the interactive instructions received at the server relative to the second interactive icon and fourth interactive icon.

4. The system as recited in claim 1, wherein the first interactive icon further comprises a plurality of icons.

5. The system as recited in claim 1, wherein the first interactive icon is selected from the group consisting of do not disturb, make up room, additional towels, fresh linens, and turn-back service.

6. The system as recited in claim 1, wherein the second interactive icon further comprise a plurality of icons.

7. The system as recited in claim 1, wherein the second interactive icon is selected from the group consisting of telephone maintenance, television maintenance, light bulb maintenance, faucet maintenance, lock maintenance, clock maintenance, iron maintenance, light fixture maintenance, toilet maintenance, HVAC maintenance, refrigerator maintenance, Wi/Fi maintenance, and general maintenance.

8. The system as recited in claim 1, wherein the third interactive icon further comprises a plurality of icons.

9. The system as recited in claim 1, wherein the third interactive icon is selected from the group consisting of dirty, deep clean needed, and clean.

10. The system as recited in claim 1, wherein the fourth interactive icon further comprises a plurality of icons.

11. The system as recited in claim 1, wherein the fourth interactive icon is selected from the group consisting of telephone maintenance, television maintenance, light bulb maintenance, faucet maintenance, lock maintenance, clock maintenance, iron maintenance, light fixture maintenance, toilet maintenance, HVAC maintenance, refrigerator maintenance, Wi/Fi maintenance, and general maintenance.

12. The system as recited in claim 1, wherein for an occupied room, the set-top box periodically resets the third icon from dirty status to clean status.

13. A set-top box with an interactive portal for use a hospitality establishment having a plurality of rooms, the set-top box comprising:
  a housing securing a television input, a television output, a processor, a transceiver, and memory therein, the housing configured to be located in an assigned room of the plurality of rooms;
  a busing architecture communicatively interconnecting the television input, the television output, the transceiver, the processor, and the memory therebetween;
  the television input configured to receive a source signal from an external source, the source signal including a plurality of channels;
  the television output configured to forward a tuned signal to a television in the assigned room, the signal being tuned from the source signal at the set-top box;
  the memory-processor combination associated with the assigned room; and
  the memory accessible to the processor, the memory including processor-executable instructions that, when executed, cause the processor to:
    receive a next room assignment from a server co-located at the hospitality establishment;
    in response to receiving a guest service request, generate a guest interactive portal including a first interactive icon relative to housekeeping of the assigned room and a second interactive icon relative to maintenance of the assigned room;
    in response to a housekeeping servicing request, generate a housekeeping interactive portal including a third interactive icon relative to the clean/dirty status of the assigned room, a fourth interactive icon relative to maintenance of the assigned room, and the next room assignment, the fourth icon functioning as a checklist configured to ensure completion of a housekeeping maintenance review list;
    forward one of the guest interactive portal and the housekeeping interactive portal to the television via the television output; and
    receive an interactive instruction relative to one of the first, second, third, and fourth interactive requests and forward the received interactive instruction to the server.

14. The set-top box as recited in claim 13, further comprising a housekeeping schedule stored at the server, the next room assignment forming a portion of the housekeeping schedule, which is dynamically maintained based on the interactive instruction relative to the first interactive icon.

15. The set-top box as recited in claim 13, further comprising a maintenance schedule stored at the server, the maintenance schedule being dynamically maintained based on the interactive instructions relative to the second interactive icon and fourth interactive icon.

16. The system as recited in claim 13, wherein the first interactive icon is selected from the group consisting of do not disturb, make up room, additional towels, fresh linens, and turn-back service.

17. The system as recited in claim 13, wherein the second interactive icon is selected from the group consisting of telephone maintenance, television maintenance, light bulb maintenance, faucet maintenance, lock maintenance, clock maintenance, iron maintenance, light fixture maintenance, toilet maintenance, HVAC maintenance, refrigerator maintenance, Wi/Fi maintenance, and general maintenance.

18. The system as recited in claim 13, wherein the third interactive icon is selected from the group consisting of dirty, deep clean needed, and clean.

19. The system as recited in claim 13, wherein the fourth interactive icon is selected from the group consisting of telephone maintenance, television maintenance, light bulb maintenance, faucet maintenance, lock maintenance, clock maintenance, iron maintenance, light fixture maintenance, toilet maintenance, HVAC maintenance, refrigerator maintenance, Wi/Fi maintenance, and general maintenance.

20. A system for operating a hospitality establishment having a plurality of rooms, the system comprising:
  a plurality of set-top boxes respectively disposed in the plurality of rooms, each set-top box programmably assigned to a respective room, each set-top box comprising:
    a housing securing a television input, a television output, a processor, a transceiver, and memory therein;
    a busing architecture communicatively interconnecting the television input, the television output, the transceiver, the processor, and the memory therebetween;
    the television input configured to receive a source signal from an external source, the source signal including a plurality of channels;

the television output configured to forward a tuned signal to a television in the assigned room, the signal being tuned from the source signal at the set-top box; and the memory accessible to the processor, the memory including processor-executable instructions that, when executed, cause the processor to:

receive a next room assignment from a server;

in response to receiving a guest service request, generate a guest interactive portal including a first interactive icon relative to housekeeping of the assigned room and a second interactive icon relative to maintenance of the assigned room;

in response to a housekeeping servicing request, generate a housekeeping interactive portal including a third interactive icon relative to the clean/dirty status of the assigned room, a fourth interactive icon relative to maintenance of the assigned room, and the next room assignment, the fourth icon functioning as a checklist configured to ensure completion of a housekeeping maintenance review list;

forward one of the guest interactive portal and the housekeeping interactive portal to the television via the television output; and receive an interactive instruction relative to one of the first, second, third, and fourth interactive requests;

the server being disposed in communication with the plurality of set-top boxes, the server being co-located at the hospitality establishment;

the server receiving the interactive instructions relative to the first, second, third, and fourth interactive requests;

a housekeeping schedule stored at the server, the next room assignment forming a portion of the housekeeping schedule, which is dynamically maintained based on the interactive instructions received at the server relative to the first interactive icon;

the server, based on the housekeeping schedule, sending each of the plurality of set-top boxes the next room assignment;

a maintenance schedule stored at the server, the maintenance schedule being dynamically maintained based on the interactive instructions received at the server relative to the second interactive icon and fourth interactive icon; and the server optimizing the maintenance schedule prior to dispatching maintenance tasks.

* * * * *